US010829684B2

(12) United States Patent
Singh et al.

(10) Patent No.: US 10,829,684 B2
(45) Date of Patent: Nov. 10, 2020

(54) NANOPARTICULATE CONTAINING PROPPANT SUSPENSION COMPOSITION WITH BREAKER AND AGGREGATOR

(71) Applicant: HALLIBURTON ENERGY SERVICES, INC., Houston, TX (US)

(72) Inventors: Dipti Singh, Kingwood, TX (US); Loan K. Vo, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 16/303,067

(22) PCT Filed: Jul. 12, 2016

(86) PCT No.: PCT/US2016/041866
§ 371 (c)(1),
(2) Date: Nov. 19, 2018

(87) PCT Pub. No.: WO2018/013084
PCT Pub. Date: Jan. 18, 2018

(65) Prior Publication Data
US 2019/0359882 A1 Nov. 28, 2019

(51) Int. Cl.
*C09K 8/80* (2006.01)
*C09K 8/88* (2006.01)

(52) U.S. Cl.
CPC .............. *C09K 8/80* (2013.01); *C09K 8/887* (2013.01); *C09K 2208/10* (2013.01); *C09K 2208/26* (2013.01)

(58) Field of Classification Search
CPC ...... E21B 43/267; C09K 8/80; C09K 2208/10
USPC .......................................... 166/280.1, 280.2
See application file for complete search history.

(56) References Cited

U.S. PATENT DOCUMENTS

| 5,853,048 | A  | * | 12/1998 | Weaver ............... C09K 8/5086 166/279 |
| 2008/0153720 | A1 |   | 6/2008 | Huang et al. |
| 2012/0048548 | A1 | * | 3/2012 | Crews .................... C09K 8/602 166/278 |
| 2013/0341022 | A1 |   | 12/2013 | Nguyen et al. |
| 2014/0034323 | A1 | * | 2/2014 | Dobson, Jr. .............. C09K 8/90 166/308.5 |
| 2015/0210913 | A1 | * | 7/2015 | Gupta ...................... C09K 8/68 166/305.1 |
| 2015/0284625 | A1 | * | 10/2015 | Silveira ................. C09K 8/685 166/305.1 |
| 2016/0009982 | A1 |   | 1/2016 | Crews et al. |

FOREIGN PATENT DOCUMENTS

| WO | 2013176977 A1 | 11/2013 |
| WO | WO-2015060823 A1 * | 4/2015 ........... E21B 33/138 |

OTHER PUBLICATIONS

International Search Report and Written Opinion; PCT Application PCT/US2016/041866; dated Mar. 8, 2017.

* cited by examiner

*Primary Examiner* — Angela M DiTrani Leff
(74) *Attorney, Agent, or Firm* — Polsinelli PC

(57) ABSTRACT

A proppant suspension composition including a proppant, gelling agent, nanoparticles, at least one breaker, and a tackifying resin. The gelling agent may include cross-linkable polymers. The nanoparticles may be natural or synthetic clays. The at least one breaker may include oxidizers, monovalent salts and/or bis-quaternary ammonium compounds. The composition can be provided downhole during fracturing operations.

18 Claims, 6 Drawing Sheets

NANOPARTICULATE CONTAINING PROPPANT SUSPENSION COMPOSITION WITH BREAKER AND AGGREGATOR

CROSS-REFERENCE TO RELATED APPLICATIONS

This application is a national stage entry of PCT/US2016/041866 filed Jul. 12, 2016, said application is expressly incorporated herein in its entirety.

FIELD

The present disclosure relates to fracturing fluids for subterranean wellbores. In particular, the present disclosure relates to a proppant suspension composition containing nanoparticles, its preparation and use.

BACKGROUND

In order to produce oil or gas, a wellbore is drilled into a subterranean formation, which may be a reservoir or adjacent to a reservoir. Such wells can be stimulated in a variety of ways including fracturing treatments. In a typical hydraulic fracturing treatment, a fluid referred to as a "fracturing fluid" is pumped through a wellbore and into a subterranean formation producing zone at a rate and pressure such that one or more fractures are formed or extended into the zone.

Newly-created or extended fractures tend to close after the pumping of the fracturing fluid is stopped. To prevent the fracture from closing, a material must be placed in the fracture to keep the fracture propped open. A material used for this purpose is referred to as a "proppant." In order to deliver the proppant into the desired location in the wellbore or formation, the proppant can be suspended in the fluid.

To fracture a subterranean formation typically requires hundreds of thousands of gallons of fracturing fluid. Further, it is often desirable to fracture at more than one downhole location of a well. Thus, a high volume of fracturing fluid is usually required to treat a well, which means that a low-cost fracturing fluid is desirable.

BRIEF DESCRIPTION OF THE DRAWINGS

Implementations of the present technology will now be described, by way of example only, with reference to the attached figures, wherein.

Figure 1:
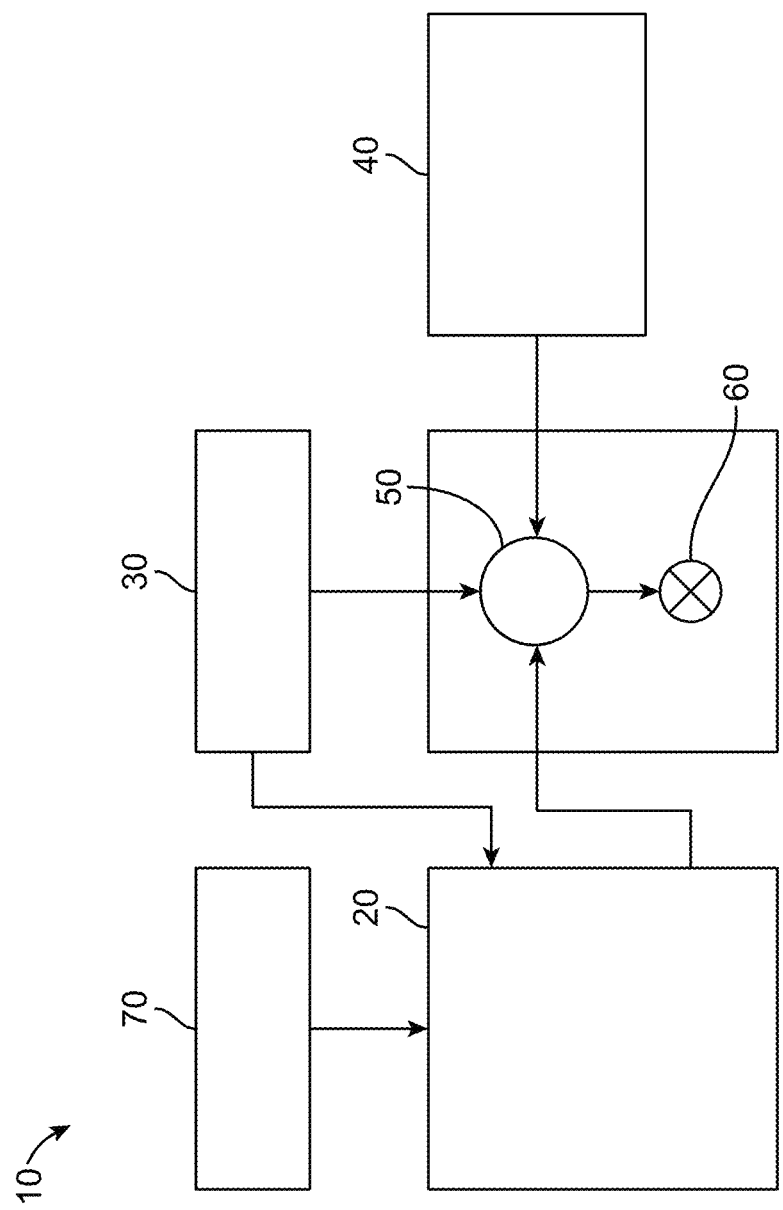
FIG. 1 is a diagram illustrating an example of a fracturing system that may be used in association with certain aspects of the present disclosure.

It should be understood that the various aspects are not limited to the arrangements and instrumentality shown in the drawings.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

It should be understood at the outset that although illustrative implementations of one or more embodiments are illustrated below, the disclosed compositions and methods may be implemented using any number of techniques. The disclosure should in no way be limited to the illustrative implementations, drawings, and techniques illustrated herein, but may be modified within the scope of the appended claims along with their full scope of equivalents.

In the following discussion and in the claims, the terms "including" and "comprising" are used in an open-ended fashion, and thus should be interpreted to mean "including, but not limited to . . . ". As used herein, the term "derivative" refers to any compound that is made from one of the listed compounds, for example, by replacing one atom in one of the listed compounds with another atom or group of atoms, ionizing one of the listed compounds, or creating a salt of one of the listed compounds.

The present disclosure is directed to a composition for suspending proppants in a fluid and introducing the same into a wellbore for fracturing operations. Accordingly, the suspension composition disclosed herein may also be referred to as a fracturing fluid. The suspension composition may include a gelling agent, such as a polymer which is cross-linkable to form a gel. The polymers employed for gelling are often natural products, and so are subject to limited supply, thereby driving up costs. Accordingly, other components such as nanoparticles may be added to assist in suspension so that less gelling agent may be required. The nanoparticles may be for example silicates, phyllosilicates, synthetic clays, or the like.

Once provided downhole it is of interest to release the proppants from the fluid so that they can remain in the formation and prop open the generated fractures. Breakers may be added to the composition to "break" the gel, for example by reducing viscosity, reducing or removing cross-linking, and reducing the overall tendency of the composition to suspend the proppant particles. However, the addition of nanoparticles clays can complicate the breaking process once downhole. Accordingly, as disclosed herein the breakers can include components which break the gel as well as those which act to break or stabilize the nanoparticles. Breakers can include oxidizers as well as alkali and/or ammonium salts such as bis-quaternary ammonium compounds ("BisQuat"). The oxidizers may have a tendency to act on the gelled polymers whereas the salts and bis-quaternary ammonium compounds may act to break or stabilize the nanoparticles.

Additionally, as disclosed herein, the composition may contain additional components which act as an aggregator subsequent or during the process of breaking. In particular, a tackifying resin may be added which acts to form the nanoparticles into aggregates or clusters. These aggregates of nanoparticles can themselves serve as proppants. The aggregates of nanoparticles and proppants form channels that prop open the fractures and provide channels for the flow of hydrocarbons into the wellbore for production.

The various components are discussed as follows followed by exemplary use in a fracturing system.

Gelling Agent

The suspension composition disclosed herein includes a component which acts a gelling agent for thickening and increasing the viscosity of the composition. For example, polymers can be suitably employed as gelling agents, including cross-linkable and/or water soluble polymers which can interconnect to thicken or form a semi-solid gel. The polymers can include natural polymers, synthetic polymers, biopolymers, or derivatives thereof. The polymers can include polysaccharides, starches, cellulose, cellulose ethers, chitosan, diutan, xanthan gum, welan gum, tragacanth gum, karaya gum, galactomannans, guar gum, polyvinyl polymers, polymethacrylamides, and derivatives of all the aforementioned, whether naturally or synthetically produced. The polymers may be self cross-linkable or are cross-linkable in the presence of a cross-linking agent.

Cellulose ethers or cellulose ether derivatives include methyl cellulose (MC), ethyl cellulose (EC), carboxymethyl cellulose (CMC), hydroxyethyl cellulose (HEC), carboxymethyl hyd roxyethyl cellulose (CMHEC), hydroxyethyl cellulose (HEC), ethyl hydroxyethyl cellulose (EHEC), methylcellulose (MC), hydroxpropylcellulose (HPC), methylhydroxyethyl cellulose (MHEC) and methylhydroxypropyl cellulose (MHPC).

Guar can include guar or derivatives, such as straight guar, carboxymethyl Guar (CMG), hydroxypropyl Guar (HPG), ethyl Guar (EG) or carboxymethylhydroxypropyl guar (CMHPG).

Additionally, charged gelling agents can be suitably employed. For example CMC may be considered charged, as well as other caboxymethyl starches or oxidized starch and oxidized cellulose. Additionally, both charged and uncharged gelling agents may be used. Suitable uncharged polysaccharides include, but are not limited to: EHEC, HPC, guar gum and HPS.

The gelling agents can be added to the suspension composition herein in a range of from about 10 to 200 lbs/1,000 gal, alternatively at a concentration of from about 0.1% to 2.4% weight/volume (e.g., g/100 ml). The gelling agents may be present in an amount in the range of from a lower limit of about 10 lbs, 20 lbs, 30 lbs, 40 lbs, 50 lbs, 60 lbs, 70 lbs, 80 lbs, 90 lbs, and 100 lbs per 1,000 gal to an upper limit of about 200 lbs, 190 lbs, 180 lbs, 170 lbs, 160 lbs, 150 lbs, 140 lbs, 130 lbs, 120 lbs, 110 lbs, and 100 lbs per 1,000 gal encompassing any value and subset there between.

The gelling agents may be present in an amount in the range of from a lower limit of about 0.1%, 0.2%, 0.3%, 0.4%, 0.5%, 0.6%, 0.7%, 0.8%, 0.9%, and 1.0% to an upper limit of about 2.4%, 2.3%, 2.1%, 2.0%, 1.9%, 1.8%, 1.7%, 1.6%, 1.5%, 1.4%, 1.3%, 1.2%, 1.1%, and 1%, weight/volume encompassing any value and subset therebetween.

Cross-Linking Agent

The cross-linking agent disclosed herein can be added to cross-link the cross-linkable polymer, so as to cause thickening and gelation of the suspension composition.

In some instances, the crosslinking agent may be a metal crosslinking agent, for example, a borate ion, a metal ion, or similar component that is capable of crosslinking at least two molecules of a gelling agent. Examples of suitable metal crosslinking agents include, but are not limited to, borate ions, magnesium ions, zirconium ions, titanium ions, aluminum ions, antimony ions, chromium ions, iron ions, copper ions, magnesium ions, zinc ions, and any combination thereof. These ions may be provided by any compound that is capable of producing one or more of these ions, including salts or complexes. Examples of such compounds may include, but are not limited to, ferric chloride, boric acid, disodium octaborate tetrahydrate, sodium diborate, pentaborates, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, and titanium acetylacetonate, aluminum lactate, aluminum citrate, antimony compounds, chromium compounds, iron compounds, copper compounds, zinc compounds, and any combination thereof.

In some instances, the crosslinking agent may be a polymeric crosslinking agent, such as, for example, a multifunctional boronic crosslinking agent. In some instances, the multifunctional boronic acid crosslinking agents of the present disclosure may comprise a polymeric backbone with a boronic acid functional group attached at one or more points along the polymer chain. In some instances, the multifunctional boronic acid cross agents may comprise a copolymer that comprises at least one boronic acid monomer unit and at least one water-soluble monomer unit.

In general, any boronic acid or boronate ester derived therefrom may be suitable for use in the multifunctional boronic acid crosslinking agents of the present disclosure. That is, the multifunctional boronic acid crosslinking agents of the present disclosure can contain a boronic acid group (e.g., —B(OH)2) or a boronate ester derived therefrom. In some instances, the boronic acids may be aryl boronic acids, particularly vinyl aryl boronic acids. A suitable aryl boronic acid that can be suitable for practicing the present disclosure may include, but is not limited to, 4-vinylphenylboronic acid or its positional isomers. Other substituted aryl boronic acids containing a polymerizable functional group (e.g., alkene) and optional functionality on the aryl ring (e.g., alkyl groups, halogens, carbonyl groups, amines, hydroxyl groups, carboxylic acids and their derivatives, and the like) may also be used, if desired. In other instances, the boronic acids containing a polymerizable functional group may be alkyl, alkenyl, or alkynyl boronic acids (i.e., aliphatic boronic acids) in which the alkyl, alkenyl, or alkynyl groups can contain optional substitution, if desired.

In some instances, a polymeric multifunctional boronic acid crosslinking agent may be a block copolymer including, but not limited to, a diblock, triblock or multiblock copolymer. A polymeric multifunctional boronic acid crosslinking agent may also be a copolymer of various monomers and can also be in the form of comb, brush, or dentritic shaped polymer. In some instances, the multifunctional boronic acid crosslinking agents of the present disclosure can be water-soluble.

Additional cross-linkers include formaldehyde releasers such as hexamethylene tetramine or trioxane combined with phenol-based derivatives such as catechol, hydroquinone, or pyrogallol.

Generally, the crosslinking agent may be present in an amount sufficient to be at least partially coated onto the particulates and to provide sufficient crosslinking reactivity with the gelling agent to suspend the multifunctional proppants in the fracturing fluid, as described herein. In some instances, the crosslinking agent may be present in an amount in the range of from a lower limit of about 0.0001%, 0.00025%, 0.0005%, 0.00075%, 0.001%, 0.0025%, 0.005%, 0.0075%, 0.01%, 0.025%, 0.05%, 0.075%, 0.1%, 0.25%, 0.5%, 0.75%, and 1% to an upper limit of about 5%, 4.75%, 4.5%, 4.25%, 4%, 3.75%, 3.5%, 3.25%, 3%, 2.75%, 2.5%, 2.25%, 2%, 1.75%, 1.5%, 1.25%, and 1% by weight of the particulates to be at least partially coated, encompassing any value and subset therebetween.

Nanoparticles

The suspension composition of the presently disclosed subject matter includes nanoparticles. The nanoparticles can be made up of natural or synthetic clays. The nanoparticles can include silicates and phyllosillicates including hectorite, bentonite, montmorillonite, beidellite and combinations thereof. The silicates and phyllosilicates can include elements of groups 1, and 2 of the periodic table, as well as transition metals, including magnesium, aluminum, potassium, lithium, iron, or calcium, or combinations thereof. The silicates and phyllosillicates may include hydroxyl groups. Exemplary phyllosilicates include magnesium silicate. An exemplary nanoparticle includes the synthetic hydrous magnesium silicate clay known by the trade name Laponite®, which is commercially available from BYK Additives Inc. (formerly Rockwood Additives). Laponite® clay, like other clays disclosed herein, can be used as a rheology modifier in aqueous solutions to impart thixotropic, shear sensitive viscosity and improve stability and syneresis control in certain commercial applications. In certain illustrative embodiments, the Laponite® clay can be Laponite-RD additive. An exemplary nanoparticle includes a synthetic hectorite known as ThermaVis® viscosifier, sold by Halliburton Energy Services, Inc.

The nanoparticles have a D50 particle size in the range of from about 1 micron to about 100 microns. For example, the nanoparticles may have a D50 particle size in the range of from a lower limit of about 1, 5, 10, 15, 20, 25, 30, 40, and 50 microns to an upper limit of about 100, 95, 90, 85, 80, 75, 70, 60, and 50 microns, encompassing any value and subset therebetween.

Nanoparticles can be present in the suspension composition in a range from about 0.1% to 20% alternatively from about 0.1% to 5%, and alternatively about 0.5% to 2%, in weight/volume (e.g., g/100 ml). Nanoparticles may be present in an amount in the range of from a lower limit of about 0.1%, 0.5%, 1.0%, 1.5%, 2.0%, 2.5%, 3.0%, 3.5%, 4.0%, 4.5%, 5.0%, 5.5%, 6.0%, 6.5%, 7.0%, 7.5%, 8.0%, 8.5%, 9.0%, 9.5%, 10%, to an upper limit of about 20.0%, 19.5%, 19.0%, 18.5%, 18.0%, 17.5%, 17.0%, 16.5%, 16.0%, 15.5%, 15.0%, 14.5%, 14.0%, 13.5%, 13.0%, 12.5%, 12.0%, 11.5%, 11.0%, 10.5%, and 10.0% in weight/volume (e.g., g/100 ml), encompassing any value and subset therebetween.

Breakers

Breakers can be incorporated into the suspension composition. They can be added to the suspension composition prior to, during, or after introduction into the wellbore. Breakers are used to "break" the gelled form of the suspension composition. This can be done by breaking apart the polymer, removing or reducing the extent of cross-linking, or otherwise reducing the viscosity or thickness of the gel.

The breaker portion of the suspension composition can include one or more of an (1) oxidative agent, (2) monovalent salt, and (3) ammonium salt compound, such as a bis-quaternary ammonium compound as discussed above.

One type of breaker employed with the suspension composition employed herein is an oxidative breaker. Oxidative breakers can include a bromate, a chlorite, a peroxide, a perborate, a percarbonate, a perphosphate, or a persulfate, an oxyacid, an oxyanion of a halogen or a combination thereof. The breaker can include any compound which releases the aforementioned breakers as ions.

Peroxide breakers can include organic or inorganic peroxides. Peroxides can include hydrogen peroxide, calcium peroxide, magnesium peroxide, or zinc peroxide. A particular class of peroxides includes persulfate breakers. Persulfate breakers can include alkali metals such as sodium persulfate or potassium persulfate. Additionally, organic persulfates such as ammonium persulfate can suitably be employed.

Other particular oxidizers include bromates such as sodium bromate or potassium bromate, chlorites such as sodium chlorite, hypochlorites such as sodium hypochlorite. Bromate breakers may require an activator such as bisulfate ion, provided from a source such as sodium bisulfite or metabisulfite (MBS). Acids can include oxoacids and oxyanions of chlorine, such as chlorous acid or hypochlorous acid. Suitable peroxides are available commercially under the tradename "Oxol™" from Halliburton Energy Services.

The oxidizing breakers may have tendency to act upon the polymer gelling agent. For example, with use of a polysaccharide, the oxidative breakers may break up the polymer chain.

However as disclosed herein, to fully break the suspension composition, additional breakers may be required which act upon clay nanoparticles, such as monovalent salts or organic ammonium salts. These can also be referred to herein as clay stabilizers. The monovalent salts can include for example potassium chloride or sodium chloride, or other alkali, alkaline earth metal, or transition metal containing salts.

An example of a suitable monovalent salt breaker with an acid is VICON NF™ breaker, a chlorous acid and sodium chloride breaker, available from Halliburton Energy Services, Inc.

In addition to monovalent salts, organic ammonium salts can be suitably employed for acting upon the nanoparticles.

These include in particular bis-quaternary amines (containing 2 quaternized amines). Additionally, the amines include 3 quaternized amine groups, or 4 quaternized amine groups, or 5 quaternized amine groups, or 6 quaternized amine groups, or 7 quaternized amine groups, or 8 quaternized amine groups, or 9 quaternized amine groups, or 10 quaternized amine groups.

An example bis-quaternary ammonium compound may have a structure of:

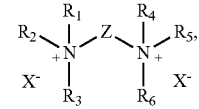

in which R1-R6 each comprise a carbon-containing group comprising 1 to about 20 carbon atoms, or 1 to about 10 carbon atoms, or 1 to about 6 carbon atoms; Z comprises a linker moiety comprising two or more atoms; and X is an anion. R1-R6 may be the same or different. In some embodiments, R1-R6 may be selected from the group consisting of alkyl, aryl, and cycloalkyl, any of which may optionally be unsaturated, branched and/or contain heteroatom substitution, if desired. Heteroatoms that may be present include, for example, O and N. In some embodiments, Z may comprise a carbon chain or a heteroatom-containing carbon chain, where the heteroatom may again be O or N, for example. Z may comprise a linker moiety such as, for example, —CH(R7)CH2-, —CH(OR7)CH2-, —CH(NR7R8)CH2-, —CH(R7)CH2CH2-, —CH2CH(R7)CH2-, —CH(OR7)CH2CH2-, —CH(NR7R8)CH2CH2-, —CH2CH(OR7)CH2-, or —CH2CH(NR7R8)CH2-, where R7 and R8 are independently selected from H or a carbon-containing group comprising 1 to about 20 carbon atoms, or 1 to about 10 carbon atoms, or 1 to about 6 carbon atoms. R7 and R8 may be selected from the group consisting of alkyl, aryl, and cycloalkyl, any of which may optionally be unsaturated, branched and/or contain heteroatom substitution.

Suitable anions X— that may balance charge in the bis-quaternary ammonium compounds may include, for example, halogens, such as fluoride, chloride, bromide, iodide; organic anions such as formate, acetate, toluenesulfonate, and methanesulfonate; sulfate, and nitrate.

Breaking may occur in controlled manner. For example, the kinetic rate of breaking may be delayed (e.g., by controlling temperature and/or concentration), the release of a breaker may be delayed (i.e., controlled release of a breaker encapsulated by an encapsulant). The encapsulants are essentially protective coatings that are thermally stable and do not degrade upon contact with breakers. The nature (e.g., length) of the delay will depend largely on the specific breaker, the encapsulant and concentration used. The controlled release of breakers may occur through a number of mechanisms involving the removal of encapsulant including, but are not limited to, degradation, biodegradation, solvation, and the like. In some cases, the release of breaker may also occur by diffusion without removal of encapsulant. In some cases, the delay may correspond to a certain event (e.g., once fracturing fluid is spent) at which point a reduction in viscosity may be desirable. Any of the above mentioned breakers disclosed herein can be encapsulated for delay release.

Illustrative bis-quaternary ammonium compounds that may be used in the embodiments described herein are further set forth in United States Patent Application Publications 2004/0235677, 2006/0013798, and 2010/0311622. One example of a bis-quaternary ammonium compound formulation that can be suitable for use in the embodiments described herein is CLA-WEB™, which is commercially available from Halliburton Energy Services, Inc. Examples of delayed release breakers include Opti-flo II™ and Opti-flo III™ delayed release breakers, both of which include encapsulated sodium persulfate.

Breakers can be included in the composition in a range of from 0.11 lbs/1000 gal to 100 lbs/1000 gal, alternatively from 0.001% to 1% by weight/volume (e.g. g/100 ml). In some instances, the breakers can be present in an amount in the range of from a lower limit of about 0.1 lbs, 1 lbs, 5 lbs, 10 lbs, 15 lbs, 20 lbs, 25 lbs, 30 lbs, 40 lbs, 45 lbs, 50 lbs, per 1,000 gal to an upper limit of about 100 lbs, 95 lbs, 90 lbs, 85 lbs, 80 lbs, 75 lbs, 70 lbs, 65 lbs, 60 lbs, 55 lbs, 50 lbs per 1,000 gal encompassing any value and subset therebetween.

In some instances, the breaker may be present in an amount in the range of from a lower limit of about 0.001%, 0.005%, 0.01%, 0.05%, 0.1%, 0.25%, 0.5%, to an upper limit of about 1%, 0.9%, 0.8%, 0.7%, 0.6%, 0.5% encompassing any value and subset therebetween.

Tackifying Agents

The suspension composition may include herein a tackifying agent that can aggregate the nanoparticles after breaking of the gel. Tackifying agents can include aqueous and non-aqueous tackifying agents. Tackifying agents can include resins or curable resins and may be natural or synthetic.

Non-aqueous tackifying agents may include, for example, polyamides, polyesters, polyethers and polycarbamates, or polycarbonates. For example, in some cases the product is a condensation reaction product of a polyacid and a polyamine. Such products may include compounds such as combinations of dibasic acids containing some trimer and higher oligomers and also small amounts of monomer acids that are reacted with polyamines. Other polyacids may include trimer acids, synthetic acids produced from fatty acids, maleic anhydride, acrylic acid, and the like. Combinations of these may be suitable as well.

In some instances, the tackifying agent includes predominately a condensation reaction product of a dimer acid containing some trimer and higher oligomers and some monomer acids with a polyamine (the polyamine can be a hylenediamine, diethylenetriamine, triethylenetetraamine, tetraethylene pentaamine and aminoethylipiperazine). These types of tackifying agents are described in U.S. Pat. Nos. 5,853,048, 5,833,000, 5,582,249, 5,775,425, 5,787,986, and 7,131,491. An example of a suitable commercially available tackifying agent is the SANDWEDGE® product sold by Halliburton Energy Services, Inc.

Natural resins include, but are not limited to, shellac. Synthetic resins include, but are not limited to, epoxies, furans, phenolics, and furfuryl alcohols, and any combination thereof in any proportion. Examples of resins suitable for coating particulates are described in U.S. Pat. Nos. 6,668,926, 6,729,404, and 6,962,200. An example of a suitable commercially available resin is the "EXPEDITE" product sold by Halliburton Energy Services, Inc.

Compounds which may be used as non-aqueous tackifying agents may include liquids and solutions of, for example, polyesters, polycarbonates, silyl-modified polyamide compounds, polycarbamates, urethanes, natural resins such as shellac, and the like. Combinations of these may be suitable as well.

Examples of tackifying agents include, but are not limited to, an acrylic acid polymer, an acrylic acid ester polymer, an acrylic acid derivative polymer, an acrylic acid homopolymer, an acrylic acid ester homopolymer (e.g., poly(methyl acrylate), poly(butyl acrylate), poly(2-ethylhexyl acrylate), and the like), an acrylic acid ester co-polymer, a methacrylic acid derivative polymer, a methacrylic acid homopolymer, a methacrylic acid ester homopolymer (e.g., poly(methyl methacrylate), poly(butyl methacrylate), poly(2-ethylhexyl methacrylate), and the like), an acrylamido-methyl-propane sulfonate polymer, an acrylamido-methyl-propane sulfonate derivative polymer, an acrylamido-methyl-propane sulfonate co-polymer, an acrylic acid/acrylamido-methyl-propane sulfonate co-polymer, and any combination thereof.

The tackifying agent is present in the range of from 0.1% to 10% in volume/weight (e.g., ml/100 g) with respect to solid content. The tackifying agent may be present in an amount in the range of from a lower limit of about 0.1%, 0.5%, 1%, 1.5%, 2.0%, 2.5%, 3.0%, 3.5%, 4.0%, 4.5%, and 5.0% to an upper limit of about 10%, 9.0%, 8.0%, 7.0%, 6.0%, 5.0% volume/weight (e.g., ml/100 g), encompassing any value and subset therebetween with respect to solid content.

Proppants

Illustrative proppant particulates that may be used in conjunction with the instant disclosure include, for example, sand, bauxite, ceramic materials, glass materials, polymer materials, polytetrafluoroethylene materials, nut shell pieces, cured resinous particulates having nut shell pieces, seed shell pieces, cured resinous particulates having seed shell pieces, fruit pit pieces, cured resinous particulates having fruit pit pieces, wood, composite particulates, and any combination thereof. Suitable composite particulates may have a binder and a filler material in which suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, the like, and any combination thereof.

The proppant particulates may be substantially spherical materials, fibrous materials, polygonal materials (such as cubic materials), irregular shapes, and any combination thereof.

The proppant particles utilized in accordance with the present disclosure are generally of a size such that formation particulate solids which migrate with produced fluids are prevented from being produced from the subterranean zone. Generally, the proppant particles have a size in the range of from about 2 to about 400 mesh, U.S. Sieve Series. In some cases, the proppant is graded sand having a particle size in the range of from about 10 to about 70 mesh, U.S. Sieve Series. Sand particle size distribution ranges are one or more of 10-20 mesh, 20-40 mesh, 40-60 mesh or 50-70 mesh, depending on the particular size and distribution of formation solids to be screened out by the consolidated proppant particles.

Proppants can be included in the composition in a range of from 0.06% to 15% weight/volume (e.g., g/100 ml). Proppants may be present in an amount in the range of from a lower limit of about 0.06%, 0.1%, 0.5%, 1.0%, 1.5%, 2.0%, 2.5%, 3.0%, 4.0%, 5.0%, 6.0%, and 7.0%, to an upper limit of about 15.0%, 14.0%, 13.0%, 12.0%, 11.0%, 10.0%, 9.0%, 8.0%, and 7.0% in weight/volume (e.g., g/100 ml), encompassing any value and subset therebetween.

Base Fluid

The suspension composition disclosed herein may include a base or carrier fluid which can serve as a phase in which components are dissolved, dispersed, or suspended. The fluid can be an aqueous fluid. The fluid may include water, saltwater, brine, freshwater, oil, acid or other fluids.

ILLUSTRATIONS

Figure 2:
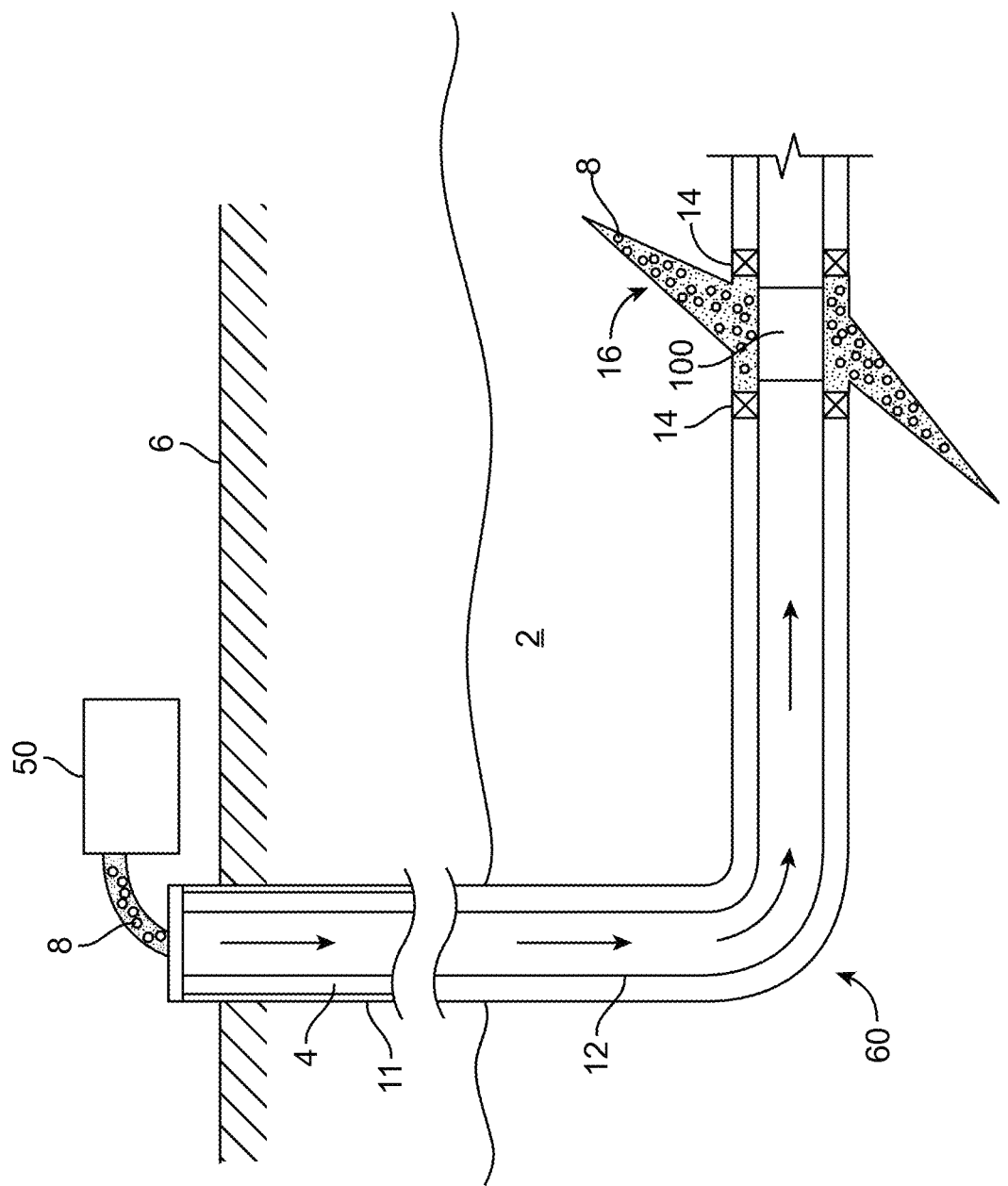
FIG. 2 is a diagram illustrating an example of a subterranean formation in which a fracturing operation may be performed in association with certain aspects of the present disclosure.

The exemplary methods and compositions disclosed herein may directly or indirectly affect one or more components or pieces of equipment associated with the preparation, delivery, recapture, recycling, reuse, and/or disposal of the disclosed compositions. For instance, an exemplary fracturing system is illustrated in FIGS. 1 and 2. In this example, the system 10 includes a fracturing fluid producing apparatus 20, a fluid source 30, a proppant source 40, and a pump and blender system 50 and resides at the surface at a well site where a well 60 is located. In certain instances, the fracturing fluid producing apparatus 20 combines a gel pre-cursor with fluid (e.g., liquid or substantially liquid) from fluid source 30, to produce a hydrated fracturing fluid that is used in fracturing the formation, for example, by being pumped through a work string 12 and a multi-acting downhole tool 100 (see FIG. 2) when in the open configuration. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, the fracturing fluid may comprise a base fluid, water, a hydrocarbon fluid, a polymer gel, foam, air, nanoparticles, breakers, wet gases and/or other fluids.

The proppant source 40 can include the proppants as disclosed herein, as well as other proppants, and can be combined with the fracturing fluid. The system may also include additive source 70 that provides one or more additives (e.g., gelling agents, weighting agents, nanoparticles, and/or other optional additives) to alter the properties of the fracturing fluid. For example, the other additives 70 can be included to reduce pumping friction, to reduce or eliminate the fluid's reaction to the geological formation in which the well is formed, to operate as surfactants, and/or to serve other functions.

The pump and blender system 50 receives the fracturing fluid and combines it with other components, including proppant from the proppant source 40 and/or additional fluid from the additives 70. The resulting mixture may be pumped down the well 60 and out through the multi-acting downhole tool 100 under a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppants, and/or other compositions to the pumping and blender system 50. Such metering devices may permit the pumping and blender system 50 to source from one, some or all of the different sources at a given time, and may facilitate the preparation of fracturing fluids using continuous mixing or "on-the-fly" methods. Thus, for example, the pumping and blender system 50 can distribute fracturing fluid and/or proppant through the multi-acting downhole tool 100 to the target subterranean zone.

FIG. 2 illustrates a well 60 performing a fracturing operation in a portion of a subterranean formation of interest 2 surrounding a well bore 4. The well bore 4 extends from the surface 6, and the fracturing fluid 8 is applied to a portion of the subterranean formation 2 surrounding the horizontal portion of the well bore through, for example, the multi-acting downhole tool 100. The tool 100 can include ports, holes, or a sleeve which permits exit of fluid from the work string 12. Although shown as vertical deviating to horizontal, the well bore 4 may include horizontal, vertical, slant, curved, and other types of well bore geometries and orientations, and the fracturing treatment may be applied to a subterranean zone surrounding any portion of the well bore. The well bore 4 can include a casing 11 that is cemented or otherwise secured to the well bore wall. The well bore 4 can be uncased or include uncased sections. In cased wells, perforations can be formed using shape charges, a perforating gun, hydro-jetting and/or other tools.

The well is shown with a work string 12 depending from the surface 6 into the well bore 4. The pump and blender system 50 is coupled to the work string 12 to pump the fracturing fluid 8 into the well bore 4. The work string 12 may include coiled tubing, jointed pipe, and/or other structures that allow fluid to flow into the well bore 4. The work string 12 can include flow control devices that control the flow of fluid from the interior of the work string 12 into the subterranean zone 2.

The work string 12 and/or the well bore 4 may include one or more sets of packers 14 that seal the annulus between the work string 12 and well bore 4 to define an interval of the well bore 4 into which the fracturing fluid 8 will be pumped. FIG. 2 shows two packers 14, one defining an uphole boundary of the interval and one defining the downhole end of the interval. When the fracturing fluid 8 is introduced into well bore 4 at a sufficient hydraulic pressure, one or more fractures 16 may be created in the subterranean zone 2. The proppant particulates in the fracturing fluid 8 may enter the fractures 16 where they may remain after the fracturing fluid flows out of the well bore. These proppant particulates may "prop" fractures 16 such that fluids may flow more freely through the fractures 16.

While not specifically illustrated herein, the disclosed methods and compositions may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

EXAMPLES

Table 1 illustrates the viscosity of nanoparticles in water as compared to the viscosity of nanoparticles with polymer gelling agents.

TABLE 1

| Sample Description | Gel Viscosity (511 s$^{-1}$ at 23° C./200° F.) cP | Observation |
|---|---|---|
| 0.75% nanoparticles in water | 2 cP/12 cP | Weak Gel |
| 1.0% nanoparticles in water | 4 cP/17 cP | Weak Gel |
| 40 lb/1000 gal CMC | ~20 cP at 23° C. | |
| 20 lb/1000 gal Guar | ~20 cP at 23° C. | |
| 40 lb/1000 gal CMC + 1% ThermaVis ® nanoparticle | 76 cP/110 cP | Thick Gel |
| 20 lb/1000 gal Guar + 1% ThermaVis ® nanoparticle | 24.8 cP/23 cP | Thick Gel |

As shown in Table 1, nanoparticles hydrated in water showed lower viscosity compared to when hydration was done in the presence of polymer gelling agents. Further, the data shows that using charged polymers such as CMC with nanoparticles showed higher gel viscosity compared to when nanoparticles were combined with uncharged guar polymer (and thus better suspension of proppant). Without the addition of nanoparticles, 40 lb/1000 gal CMC was comparable to 20 lb/1000 gal Guar at 511 s$^{-1}$, 23° C. However, with the addition of nanoparticles, there is a synergistic effect of increased viscosity when employing charged gelling polymer with nanoparticles, showing more than three times increase in viscosity as compared to uncharged gelling polymer.

Figure 3A:
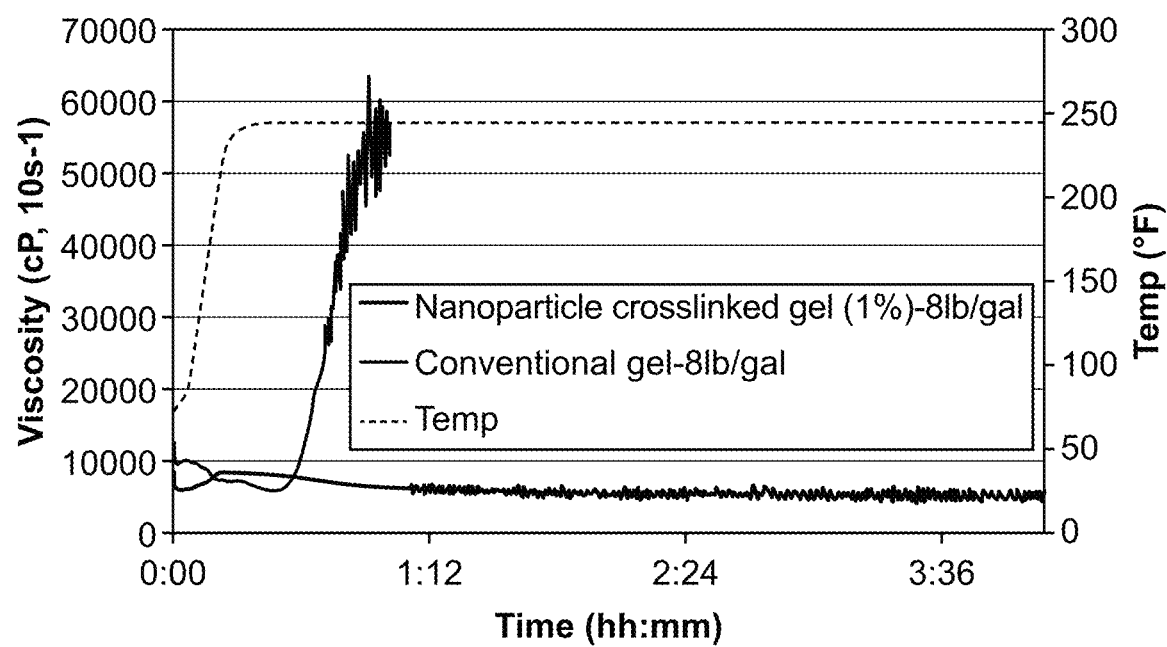
FIG. 3A is a graph illustrating the effect of a high temperature over time on a proppant suspension.
Figure 3B:
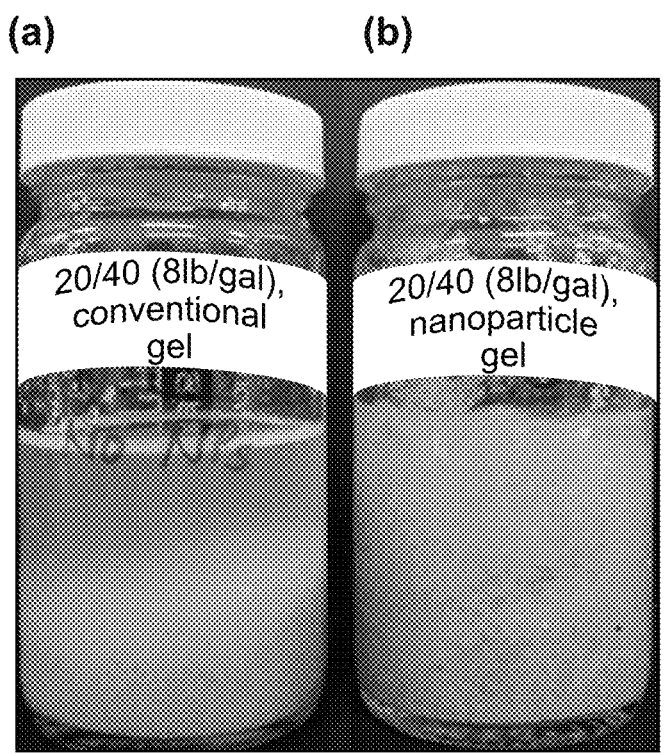
FIG. 3B illustrates the suspension of proppant in a nanoparticle gel, and the settling of proppant in conventional gel.

FIG. 3A illustrates the effect of high temperature, in this case 250° F. over time on proppant suspension. As shown, proppant settling was observed with a conventional fluid (i.e. gelling polymer with no nanoparticles). Sharp increase in the curve confirms proppant settling. The settling of proppant is shown in container (a) of FIG. 3B, where proppant has settled toward the bottom of the container. However, with the addition of nanoparticles with charged gelling polymer, as well as a metal crosslinker, no significant proppant settling was noticed. The lack of settling, and still suspended proppant is shown in container (b) of FIG. 3B.

Figure 4A:
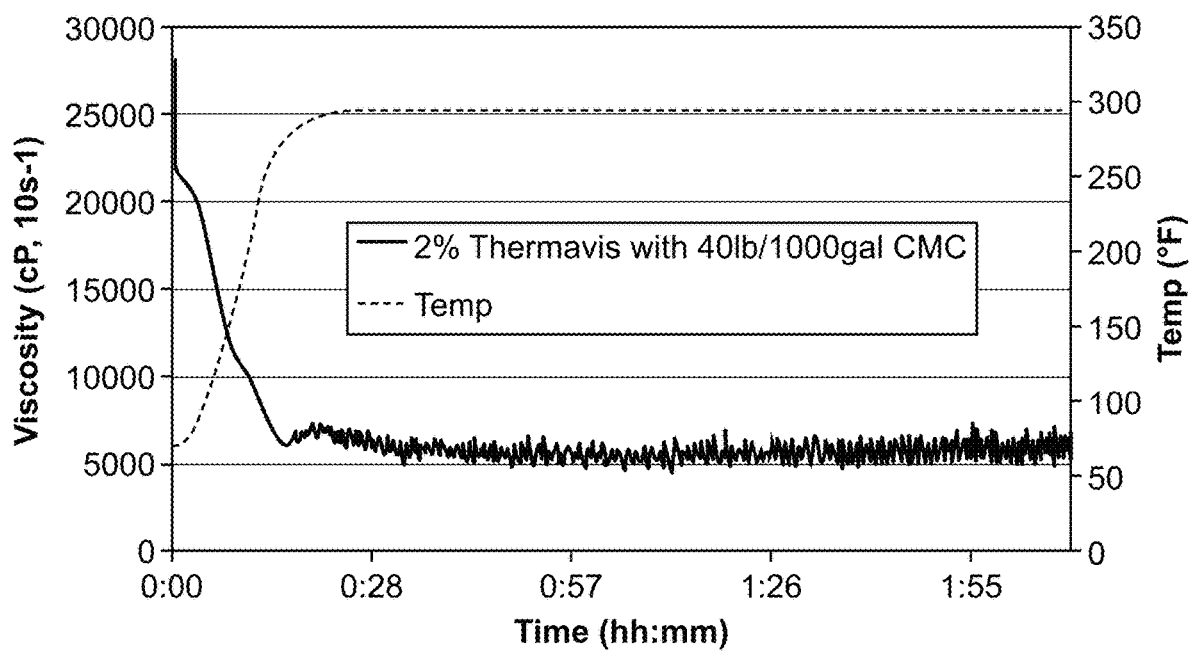
FIG. 4A is a graph illustrating the effect of a high temperature over time on proppant suspension.
Figure 4B:
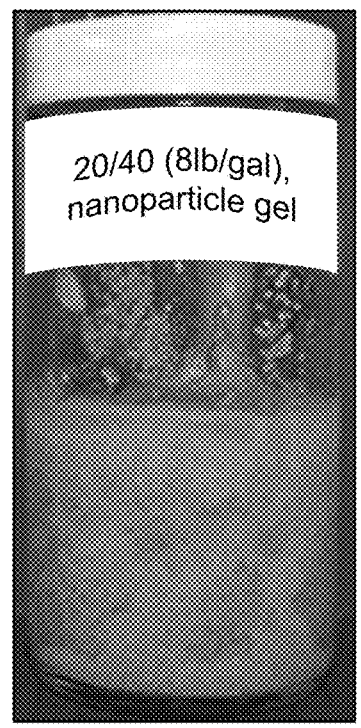
FIG. 4B illustrates the suspension of proppant in a nanoparticle gel.

FIG. 4A also demonstrates the effect of high temperature over time, but at a higher temperature of 300° F. Further, a higher concentration of nanoparticles were added due to the higher temperature, namely 2% ThermaVis® nanoparticle, along with CMC and no settling of the proppant was observed. FIG. 4B shows a container of proppant suspension with no significant settling of proppant, with a composition having 2% ThermaVis® nanoparticle, 40 lb/1000 gal CMC at 300° after ~3 h.

Figure 5A:
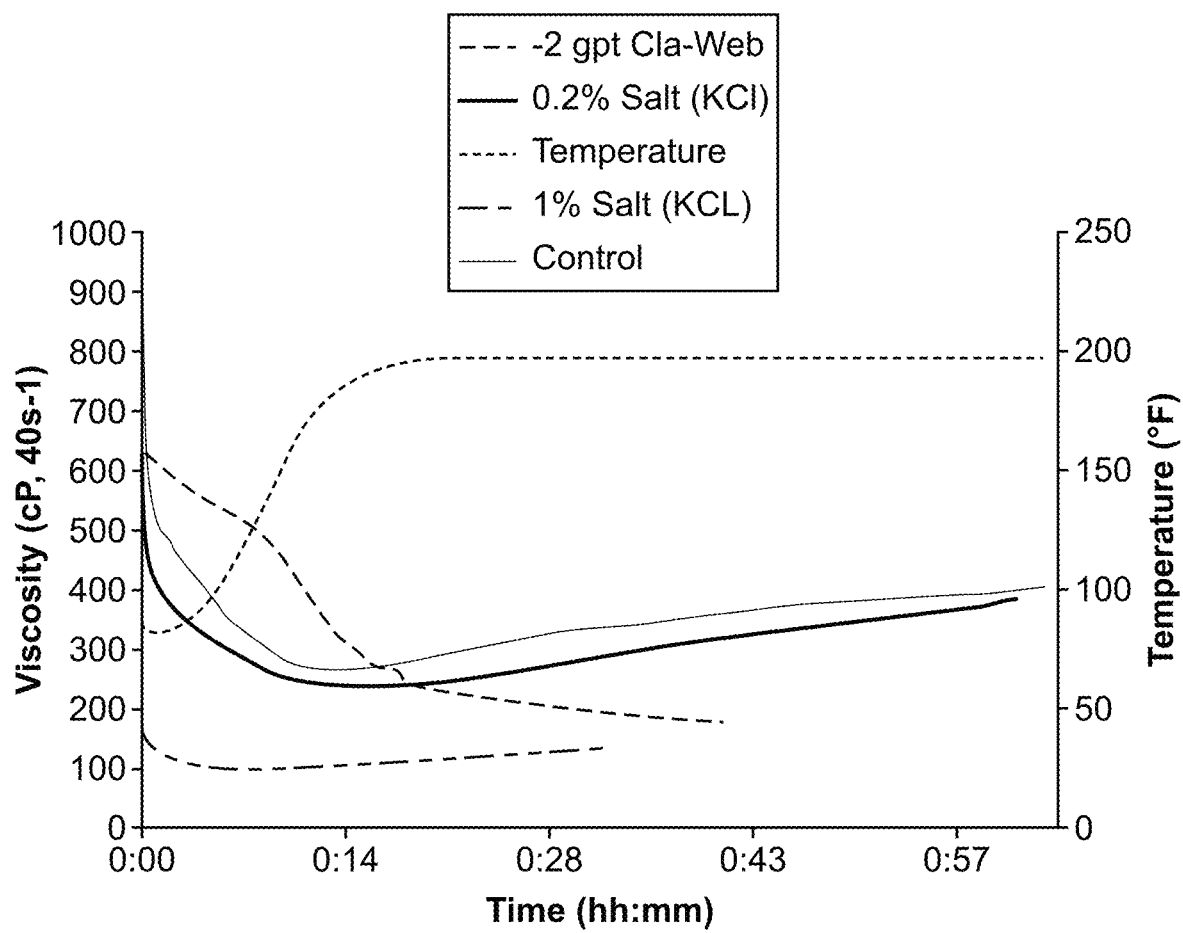
FIG. 5A illustrates is a graph illustrating the effect of a high temperature over time on a proppant suspension.
Figure 5B:
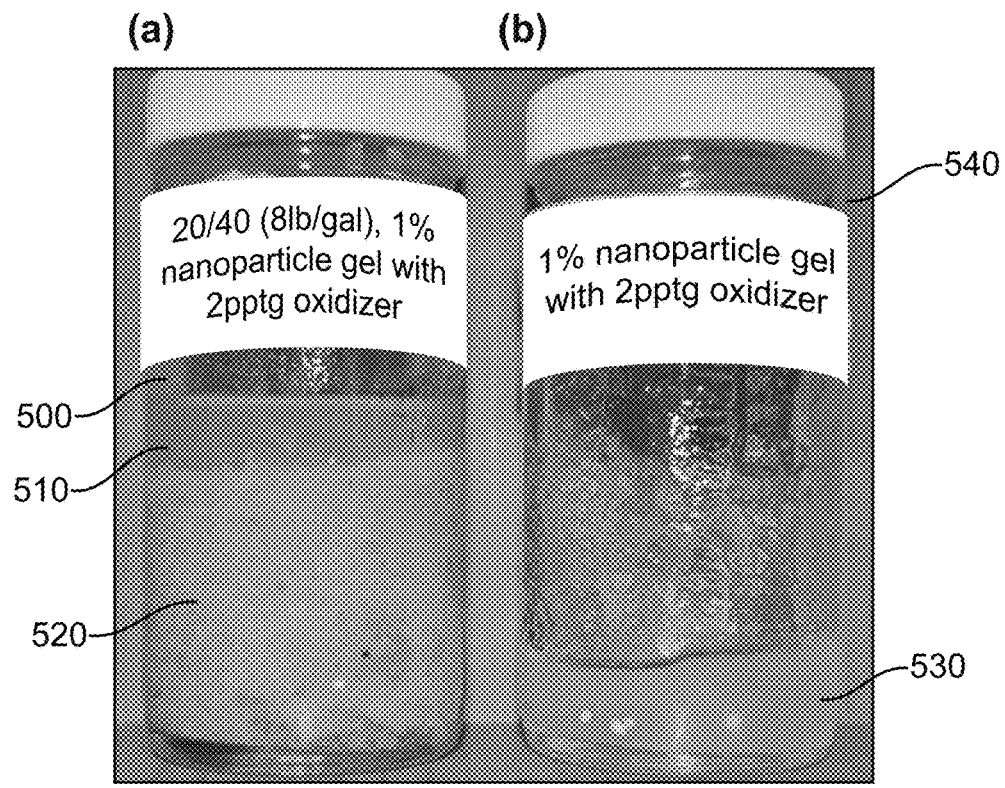
FIG. 5B illustrates the effects of an oxidizing breaker with a nanoparticle gel.
Figure 5C:
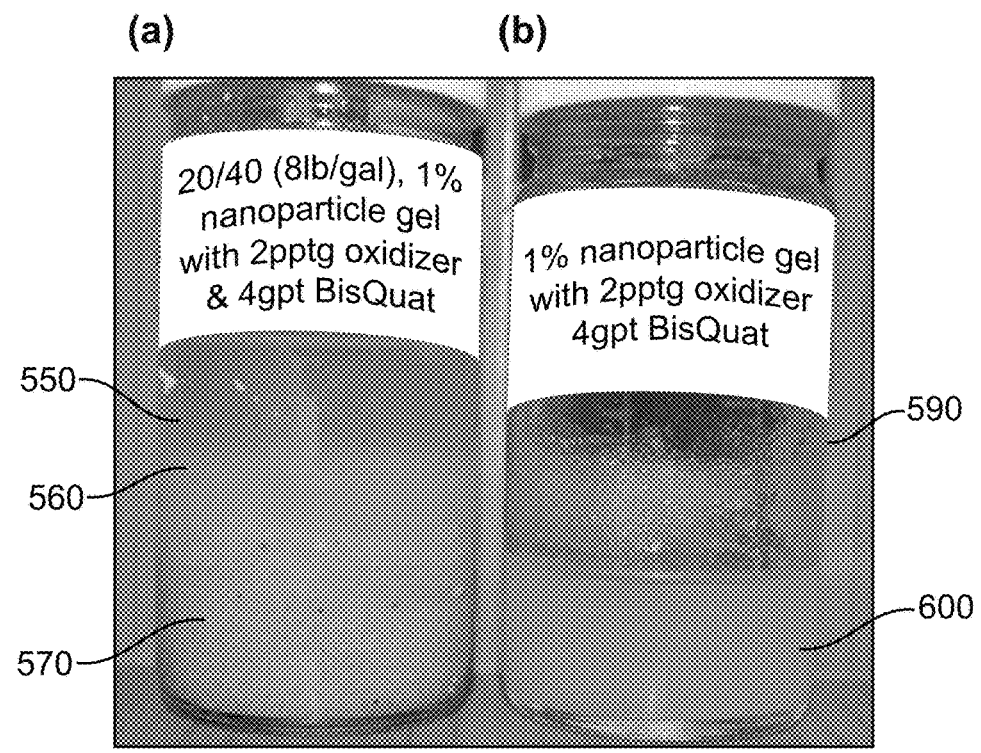
FIG. 5C illustrates the effects of an oxidizing breaker and bis-quaternary ammonium compound with a nanoparticle gel.

The addition of a breaker to the suspension composition is illustrated in FIG. 5A. As illustrated in FIG. 5A, gelled 1% ThermaVis® nanoparticle with 40 lbs/1000 gal CMC was tested with various breakers including salt breakers (KCL at 0.2% and 1%) as well as a bis-quaternary ammonium salt (CLA-WEB™). The 0.2% KCL salt breaker was not of sufficiently high concentration to have an effect different from the control, however, the 1% KCL showed breaking. Furthermore, the 2 gpt (gallons per thousand) CIa-Web™ breaker showed breaking of the gel. Whereas when proppant suspension test were conducted, using only BisQuat or oxidizer did not break the gel completely. Breaking of the gel with only oxidizer is illustrated in FIG. 5B part (a) wherein container 500 is shown with 20/40 (8 lbs/gal) CMC, 1% nanoparticle gel with 2 pptg (parts per thousand gallons) oxidizer. This showed partial breaking, as illustrated by the broken fluid in portion 510 which has no proppant. However, portion 520 shows proppant still largely suspended. Part (b) of FIG. 5B illustrates 1% nanoparticle gel with 2 pptg oxidizer without any proppant. As shown an unbroken gel is shown in portion 530 of the container 540. This is further illustrated in part (a) of FIG. 5C, which shows a container 550 with 20/40 (8 lbs/gal) CMC, with 1% nanoparticle gel with 2 pptg oxidizer and 4 gpt BisQuat breaker. As shown, proppant has settled in portion 570, with portion 560 having broken low viscosity fluid. Part (b) of FIG. 5C in container 590 having 1% nanoparticle gel with 2 pptg oxidizer and 4 gpt BisQuat without proppant, wherein the gel is shown broken in portion 600.

Moreover, the addition of tackifying resin showed the formation of nanoparticle aggregates after breaking of the composition. In Table 2, all formulations were made using 0.75% ThermaVis® nanoparticle in water at room temperature.

TABLE 2

| | No Sonication | | |
|---|---|---|---|
| Sample # | D10 (μm) | D50 (μm) | D90 (μm) |
| 1% KCL | 6.33 | 14.1 | 33 |
| 2% KCL | 6.37 | 13.2 | 30.1 |
| 4% KCL | 6.27 | 14.2 | 33.7 |
| 0.75% ThermaVis ® nanoparticle | 6.05 | 29.3 | 98.9 |
| 2gpt Bis-Quat | 17.2 | 32.2 | 55.9 |
| 4gpt Bis-Quat | 15.2 | 27.4 | 46.7 |

TABLE 2-continued

| | No Sonication | | |
|---|---|---|---|
| Sample # | D10 (μm) | D50 (μm) | D90 (μm) |
| 2 gpt Bis-Quat + 2% KCL | 11 | 18.9 | 32 |
| 1 gpt SW-ABC | 18.5 | 109 | 311 |

Particle size analysis showed a reduction in particle size in the presence of salt and ammonium salt breakers (clay stabilizers). This can be seen with the decreased D50 particle size with 1%, 2%, and 4% KCL, and the decreased D90 particle size in the presence of bis-quaternary ammonium (Bis-Quat). De-swelling was also noticed (as in FIG. 5) supporting reduction in particle size of these particulates. However, with the addition of SandWedge ABC (SW-ABC) enhancer (a tackifying resin), surprisingly, the particle size of ThermaVis® nanoparticles increased significantly likely due to aggregating.

Numerous examples are provided herein to enhance understanding of the present disclosure. A specific set of statements are provided as follows.

Statement 1: A proppant composition including: a gelling agent; a cross-linking agent; nanoparticles; and at least one breaker.

Statement 2: The composition according to Statement 1, wherein the nanoparticles are synthetic clays.

Statement 3: The composition according to Statement 1 or 2, wherein the nanoparticles comprise a phyllosilicate.

Statement 4: A composition according to Statements 1-3, wherein the nanoparticles are selected from the group consisting of magnesium silicate, hectorite, bentonite and combinations thereof.

Statement 5: A composition according to Statements 1-4, wherein the nanoparticles have a D50 in the range of from about 1 micron to about 100 microns.

Statement 6: A composition according to Statements 1-5, wherein the gelling agent is selected from the group consisting of cellulose, polysaccharide, acrylamides, acrylic acid, and mixtures thereof.

Statement 7: A composition according to Statements 1-6, wherein the gelling agent is uncharged.

Statement 8: A composition according to Statements 1-7, wherein the at least one breaker comprises an oxidative breaker.

Statement 9: A composition according to Statements 1-8, wherein the at least one breaker comprises a salt breaker.

Statement 10: A composition according to Statements 1-9, wherein the breaker comprises a bis-quaternary ammonium compound.

Statement 11: A composition according to Statements 1-10, wherein the at least one breaker includes both a salt breaker and a bis-quaternary ammonium compound.

Statement 12: A composition according to Statements 1-11, wherein the at least one breaker includes an oxidative breaker, a salt breaker and a bis-quaternary ammonium compound.

Statement 13: A composition according to Statements 1-12, wherein the nanoparticles are present in the composition in a range from about 0.1% to about 20% by weight/volume, and the gelling agent are present in a range from about 0.01% to about 2.0% weight/volume.

Statement 14: A composition according to Statements 1-13 further including a tackifying agent.

Statement 15: A composition according to Statements 1-14, wherein the tackifying agent comprises a polyamide.

Statement 16: A composition according to Statements 1-15, further including a proppant.

Statement 17: A composition according to Statements 1-16, wherein the composition further includes an aqueous base fluid.

Statement 18: A method including introducing a proppant suspension composition into a wellbore, the composition including: a proppant, a cross-linkable polymer, a cross-linking agent, nanoparticles, and at least one breaker.

Statement 19: The method according to Statement 18, further including a tackifying agent.

Statement 20: The method according to Statement 18 or 19, further including mixing the composition using mixing equipment.

Statement 21: The method according to Statements 18-20, wherein the composition is introduced into a subterranean formation using one or more pumps.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. Rather, the described features and steps are disclosed as possible components of systems and methods within the scope of the appended claims. Moreover, claim language reciting "at least one of" a set indicates that one member of the set or multiple members of the set satisfy the claim.

The invention claimed is:

1. A proppant suspension composition comprising:
   a proppant;
   a gelling agent;
   a cross-linking agent;
   nanoparticulate clay;
   a tackifying agent; and
   at least one breaker, wherein the at least one breaker comprises a bis-quaternary ammonium compound.

2. The suspension composition of claim 1, wherein the nanoparticulate clay is synthetic clays.

3. The suspension composition of claim 1, wherein the nanoparticulate clay comprises a phyllosilicate.

4. The suspension composition of claim 1, wherein the nanoparticulate clay is selected from the group consisting of magnesium silicate, hectorite, bentonite and combinations thereof.

5. The suspension composition of claim 1, wherein the nanoparticulate clay has a D50 in the range of from about 1 micron to about 100 microns.

6. The suspension composition of claim 1, wherein the gelling agent is selected from the group consisting of cellulose, polysaccharide, acrylamides, acrylic acid, and mixtures thereof.

7. The suspension composition of claim 1, wherein the gelling agent is uncharged.

8. The suspension composition of claim 1, wherein the at least one breaker further comprises an oxidative breaker.

9. The suspension composition of claim 1, wherein the at least one breaker further comprises a salt breaker.

10. The suspension composition of claim 1, wherein the gelling agent is a charged gelling agent.

11. The suspension composition of claim 10 wherein the charged gelling agent comprises carboxymethyl cellulose.

12. The suspension composition of claim 1, wherein the nanoparticulate clay is present in the composition in a range from about 0.1% to about 20% by weight/volume and the gelling agent is present in a range from about 0.01% to about 2.0% weight/volume.

13. The suspension composition of claim 1, wherein the tackifying agent comprises a polyamide.

14. The suspension composition of claim 1, wherein the composition further comprises an aqueous base fluid.

15. A method comprising:
   introducing a proppant suspension composition into a wellbore, the composition comprising:
   a proppant,
   a cross-linkable polymer,
   a cross-linking agent,
   nanoparticulate clay,
   a tackifying agent, and
   at least one breaker, wherein the at least one breaker comprises a bis-quaternary ammonium compound.

16. The method of claim 15, further comprising mixing the composition using mixing equipment.

17. The method of claim 16, wherein the composition is introduced into a subterranean formation using one or more pumps.

18. The method of claim 15, wherein the cross-linkable polymer is a charged gelling agent.

* * * * *